United States Patent Office 3,799,953
Patented Mar. 26, 1974

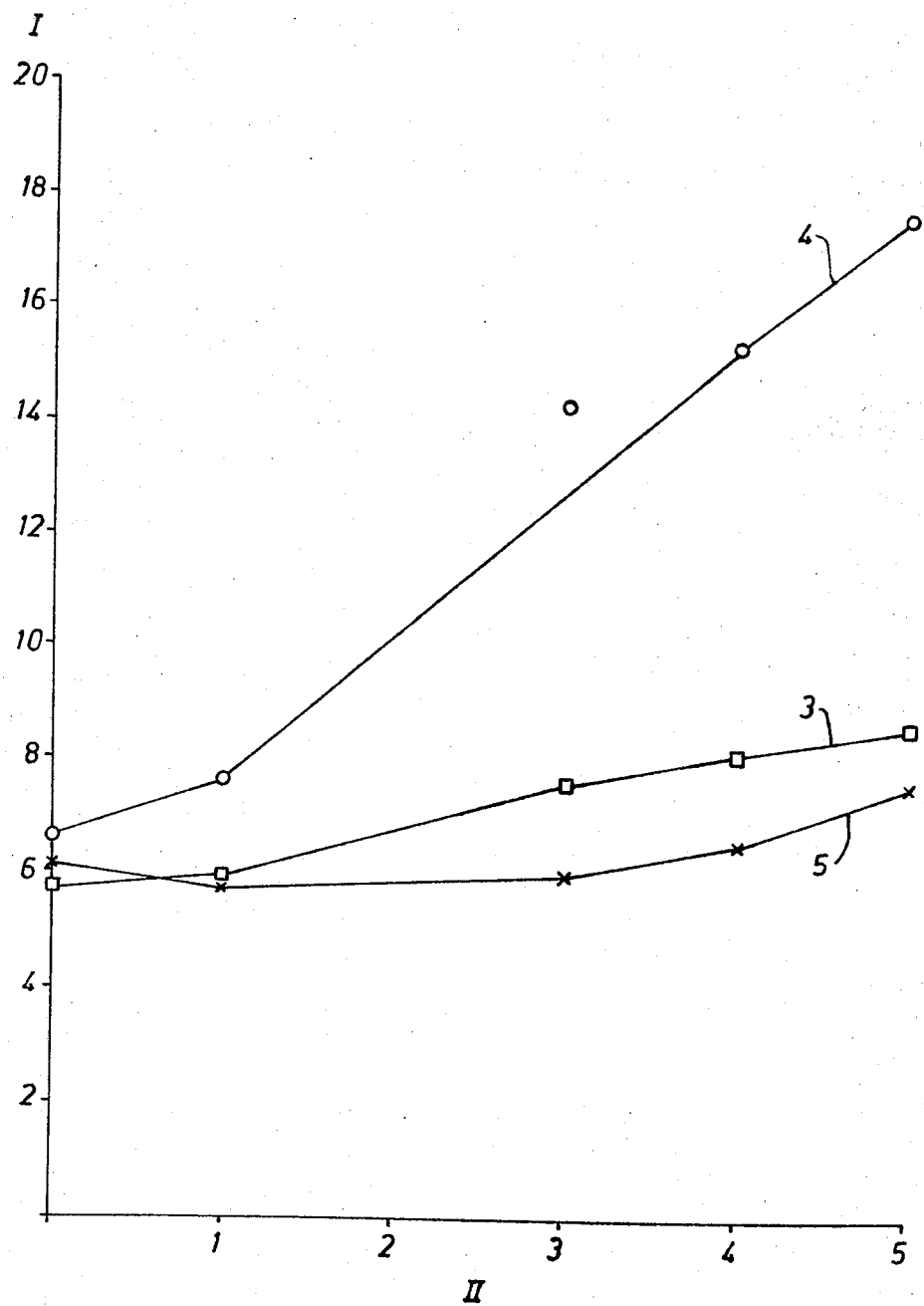

3,799,953
1,4-BIS(4,'4"-DIHYDROXY-TRIPHENYL-METHYL) BENZENE
Dieter Freitag, Ulrich Haberland, and Heinrich Krimm, Krefeld-Bockum, Germany, assignors to Bayer Aktiengesellschaft, Leverkusen, Germany
Continuation-in-part of application Ser. No. 178,443, Sept. 7, 1971. This application Sept. 1, 1972, Ser. No. 285,699
Int. Cl. C07c *39/16*
U.S. Cl. 260—395    1 Claim

ABSTRACT OF THE DISCLOSURE

The subject matter of the invention relates to 1,4-bis-bis-(4',4"-dihydroxy-tri-phenyl-methyl)-benzene and plastics, in particular to branched polycarbonates, on the basis of this tetra-hydroxy-compound.

This application is a continuation-in-part application of application Ser. No. 178,443, filed Sept. 7, 1971 now abandoned.

The subject matter of the invention relates to 1,4-bis-(4',4"-dihydroxy-tri-phenyl-methyl)-benzene and plastics, in particular to branched polycarbonates, on the basis of this tetra-hydroxy-compound.

According to the German Offenlegungsschrift 1,570,533 respectively U.S. Pat. application 3,544,514 more than bivalent phenols, such as phloroglucine, 4,6-dimethyl-2,4,6-tri-(4 - hydroxyphenyl) - heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane and 2,2-bis-[4,4'-(dihydroxydiphenyl)-cyclohexyl]-propane are suitable for the preparation of branched polycarbonates whose melts have improved stability.

It has now been found that when using 1,4-bis(4,4"'-dihydroxy-tri-phenyl-methyl)-benzene, polycarbonates are obtained which not only possess the advantages mentioned in the German Offenlegungsschrift 1,570,533 but also improved non-Newtonian flow behavior and increased thermostability. The use of 1,4-bis-(4',4"-dihydroxy-tri-phenyl-methyl)-benzenes also has the advantage that this tetraphenol is effective in lower concentrations. The incorporation of the new tetraphenol in polycarbonates is carried out according to the U.S. Pat. specification 3,544,514 respectively to the German Offenlegungsschrift 1,570,533.

There is no description of 1,4-bis-(4',4"-dihydroxy-triphenyl-methyl)-benzene in the past literature.

It is prepared according to the invention by condensation of 1,4-bis-(α,α-dichloro-benzyl)-benzene with phenol in accordance with the given formula scheme, the 1,4-bis-(α,α-dichloro-benzyl)-benzene being obtainable either by chlorination of 1,4-dibenzyl-benzene or by chlorination of 1,4-dibenzoyl-benzene according to processes known from the literature:

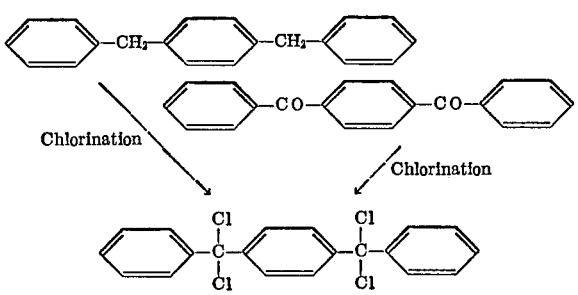

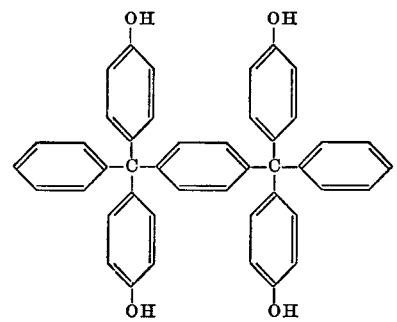

The new compound is colorless and crystalline. It melts at 314–316° C. and dissolves in the conventional organic solvents such as dioxane, acetone, methanol, ethanol, glacial acetic acid, dimethyl formamide and dimethyl sulphoxide as well as in organic bases such as triethylamine, quinoline, pyridine, and inorganic bases such as dilute potassium hydroxide solution and sodium hydroxide solution. The alkaline solutions are colorless and not sensitive to air.

The structure of the 1,4-bis-(4',4"-dihydroxy-tri-phenyl-methyl)-benzene is ensured by elementary analysis, infrared and NMR spectrum.

Elementary analysis $C_{44}H_{34}O_4$ (626.71): Calculated: C, 84.32%; H, 5.47%; O, 10.21%; OH, 10.87%. Found: C, 84.2–84.4%; H, 5.47%; O, 10.2–10.4%; OH, 11.0–11.2%.

The reaction of the 1,4'-bis-(α,α-dichloro-benzyl)-benzene to form 1,4-bis-(4',4"-dihydroxy-tri-phenyl-methyl)-benzene is carried out at temperatures between 10–150° C., preferably between 50–140° C., by bringing the reactants together possibly in the presence of diluents. The reaction course can be controlled by the amount of hydrogen chloride which has been split off.

Metal halides, such as aluminium chloride, boron trifluoride, zinc chloride or tin tetrachloride as well as halides of phosphor, such as phosphorus trichloride, phosphorus pentachloride as well as phosphoroxy chloride can be added. Suitable diluents are for example glacial acetic acid, dioxane, aromatic hydrocarbons such as benzene, toluene, xylene as well as hexane or petroleum ether.

The multivalent phenol formed during the reaction precipitates in the presence of the above-mentioned diluents from the reaction solution. To purify the compound it is removed from the solid product by suction filtration and, if necessary, the residue is recrystallized from o-dichlorobenzene.

The yield of pure 1,4-bis-(4',4"-dihydroxy-triphenyl-methyl)-benzene is over 80% of the theory based on the used 1,4-bis-(α,α-dichloro-benzyl)-benzene.

This new tetraphenol can be employed for the preparation of branched polycarbonates which may be produced from any suitable dihydroxy compounds.

Therefore, another subject of the invention is a high molecular weight, branched polycarbonate substantially free of crosslinking which comprises a polycarbonate polymer containing residues of an organic dihydroxy compound, about 0.01 to about 1 mol percent of residues of 1,4-bis(4,4"'-dihydroxy-tri-phenyl - methyl) - benzene and about 0.1 to about 8 mol perecnt of monohydric phenol, the mol percentages being based on the mols of the organic dihydroxy compound, said branched polycarbonate having a relative viscosity of from 1.2 to about 1.55 measured on a solution of 0.5 gram in 100 ml. of methylene chloride at 20° C., and average molecular weight of between about 30,000 and about 100,000 measured by light diffusion and melt viscosity of between 20,000 and about 300,000 poises at 280° C.

High molecular weight thermoplastic polycarbonates may be produced from any suitable dihydroxy compounds including aliphatic, cycloaliphatic and aromatic dihydroxy compounds. Some such suitable aromatic dihydroxy compounds include, for example, the dimonohydroxy arylene alkanes and the dimonohydroxy arylene sulphones such as, for example, 4,4'-dihydroxydiphenylene sulphone,
2,2-dihydroxydiphenylene sulphone,
3,3'-dihydroxydiphenylene sulphone,
4,4'-dihydroxy-2,2'-dimethyldiphenylene sulphone,
4,4'-dihydroxy-3,3'-dimethyldiphenylene sulphone,
2,2'-dihydroxy-4,4'-dimethyldiphenyl sulphone,
4,4'-dihydroxy-2,2'-diethyldiphenylene sulphone,
4,4'-dihydroxy-3,3'-diethyldiphenylene sulphone,
4,4'-dihydroxy-2,2'-di-tert.-diphenylene sulphone,
4,4'-dihydroxy-3,3'-di-tert.-butyl-diphenylene sulphone, and 2,2'-dihydroxy-1,1'-dinaphthylene sulphone,
4,4'-dihydroxy-diphenylene-methane,
1,1,-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4-dihydroxy-diphenylene)-2-methyl-propane,
1,1-(4,4-dihydroxy-diphenylene)-heptane,
1,1-(4,4-dihydroxy-diphenylene)-1-phenyl-methane,
(4,4'-dihydroxy-diphenylene)-(4-methyl-phenylene)-methane,
(4,4'-dihydroxy-diphenylene)-(4-ethyl-phenylene)-methane,
(4,4'-dihydroxy-diphenylene)-(4-isopropyl-phenylene)-methane,
(4,4'-dihydroxy-diphenylene)-(4-butyl-phenylene)-methane,
(4,4'-dihydroxy-diphenylene)-benzyl-methane,
(4,4'-dihydroxy-diphenylene)-alpha-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane,
2,2-(4,4'-dihydroxy-diphenylene)-4-methyl-pentane,
2,2-(4,4'-dihydroxy-diphenylene)-heptane,
2,2-(4,4'-dihydroxy-diphenylene)-octane,
2,2-(4,4'-dihydroxy-diphenylene)-nonane,
1,1-(4,4'-dihydroxy-diphenylene)-1-phenyl-ethane,
(4,4'-dihydroxy-diphenylene)-1-(alpha-furyl)-ethane,
3,3-(4,4'-dihydroxy-diphenylene)-pentane,
4,4'-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2-(4,4'-dihydroxy-diphenylene)-decahydronaphthalene,
2,2-(4,4'-dihydroxy-3,3'-dicyclohexyl-diphenylene)-propane,
2,2'-(4,4'-dihydroxy-3-methyl-diphenylene)-propane,
2,2-(4,4'-dihydroxy-3-isopropyl-diphenylene)-butane,
1,1-(4,4'-dihydroxy-3,3'-dimethyl-diphenylene)-cyclohexane,
2,2-(4,4'-dihydroxy-3,3'-dibutyl-diphenylene)-propane,
2,2-(4,4'-dihydroxy-3,3'-diphenyl)diphenylene)-propane,
2,2-(4,4'-dihydroxy-2,2'-dimethyl-diphenylene)-propane,
1,1-(4,4'-dihydroxy-3,3'-dimethyl-6,6'-ditert-.butyl-diphenylene)-ethane,
1,1-(4,4'-dihydroxy-3,3'-dimethyl-6,6'-ditert.-butyl-diphenylene)-propane,
1,1-(4,4'-dihydroxy-3,3'-dimethyl-6,6'-ditert.-butyl-diphenylene)-butane,
1,1-(4,4'-dihyroxy-3,3'-dimethyl-6,6'-ditert.-butyl-diphenylene)-isobutane,
1,1-(4,4'-dihydroxy-3,3'-dimethyl-6,6'-ditert.-butyl-diphenylene)-heptane,
1,1-(4,4'-dihydroxy-3,3'-dimethyl-6,6'-ditert.-butyl-diphenylene)-1-phenyl-methane,
1,1-(4,4'-dihydroxy-3,3'-dimethoxy-6,6'-ditert.-butyl diphenylene)-2-methyl-2-pentane,
1,1-(4,4'-dihydroxy-3,3'-methyl-6,6'-ditert.-butyl-diphenylene)-2-ethyl-2-hexane.
1,1-(4,4'-dihydroxy-3,3'-dimethyl-6,6'-ditert.-butyl-diphenylene)-butane, the corresponding bis-hydroxyphenyl ethers, sulphides sulphoxides and the like.

Among the great number of suitable di-monohydroxy arylene alkanes which may be used are the 4,4'-dihydroxy-diphenylene alkanes and it is preferred that of this class of compounds 2,2-(4,4'-dihydroxy-diphenylene)-propane,
bis-(4-hydroxy-3,5-dichlorophenyl)-propane-2,2,
bis-(4-hydroxy-3,5-dibromo-phenyl)-propane-2,2,
bis-(4-hydroxy-3,5-dimethyl-phenyl)-propane-2,2 and
1,1-(4,4'-dihydroxy-diphenylene)-cyclohexane be used.

Any suitable aliphatic dihydroxy compounds may be used including, for example, ethylene glycol, diethylene glycol, triethylene glycol, polyethylene glycol, thiodiglycol, ethylene dithioglycol, the di- and poly-glycols produced from propylene oxide-1,2, o, m or p-xylyene glycol, propanediol-1,3-, butanediol-1,3- butanediol-1,4-, 2-methyl-propanediol - 1,3- pentanediol-1,5, 2-ethylpropanediol-1,3, hexanediol-1,6, octanediol-1,8, 1-ethylhexanediol-1,3, decanediol-1,10 and the like.

Any other suitable aromatic dihydroxy compounds may also be used. Some such suitable compounds include hydroquinone, resorcinol, pyrocatechol, 4,4'-dihydroxydiphenyl, 2,2' - dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxy anthracene, 2,2'-dihydroxynaphthalene, 1,1'- and o, m and p-hydrobenzyl alcohol and the like.

Any suitable cycloaliphatic dihydroxy compounds may be used incluching cyclohexanediol-1,4- cyclohexanediol-1,2, 2,2 - (4,4'-dihydroxy-dicyclohexylene)-propane, 2,6-dihydroxy decahydronaphthalene, the corresponding bis-alkoxylated aromatic dihydroxy compounds thereof and the like.

Any suitable monohydric phenols may be used to prepare the polycarbonate of this invention. Some such suitable compounds include, for example, phenol, lower alkyl phenols such as, for example, 4-methylphenol, 3-ethylphenol, 5-propylphenol, 4-isopropylphenol, 5-butylphenol, 3 - isobutylphenol, 4-tertiary butylphenol, 4-pentylphenol and the like; aryl phenols such as, for example, 4-phenyl phenol, 5-phenyl phenol and the like; cycloaliphatic phenols such as, for example, 4-cyclohexyl phenol, 3-cyclopentyl phenol and the like; monophenol alkanes such as, for example, 2,2-(4-hydroxyphenyl)-4-methoxyphenyl-propane, 3-hydroxyphenyl ethane.

The formation of the high molecular weight polycarbonates by the reaction of di-(monohydroxyaryl)-alkanes with derivatives of carbonic acid may be carried out by the conventional technique known in the art. For example phosgene can be introduced into a solution of di-(monohydroxyaryl)-alkanes in organic bases such as dimethylaniline, diethylaniline, trimethylamine and pyridine, or into solutions or d-(monohydroxyaryl)-alkanes in indifferent organic solvents such as benzene, ligroin, cyclohexane, methylcyclohexane, benzene, toluene, xylene, chloroform, methylenechloride, carbon tetrachloride, trichloroethylene, trichloroethane, methyl acetate and ethyl acetate with the addition of an acid binding agent.

A process particularly suitable for producing polycarbonates consists of introducing phosgene into an aqueous solution of alkali metal salts such as lithium, sodium, potassium and calcium salts of the di-(monohydroxyaryl)-alkanes, preferably in the presence of an excess of a base such as lithium, sodium, potassium and calcium hydroxide or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

It is also possible to react the di-(monohydroxyaryl)-alkanes with equal molecular amounts of bis-chlorocarbonic acid esters of di-(monohydroxyaryl)-alkanes under corresponding conditions.

Also, the di-(monohydroxyaryl)-alkanes can be re-esterified with carbonic acid diesters, e.g. dimethyl, diethyl, dipropyl, dibutyl, diamyl, dioctyl, dicyclohexyl, diphenyl and di-, o-, p-tolyl carbonate at elevated temperatures from about 50° C. to about 320° C. and especially from about 120° C. to about 280° C.

When using phosgene or bis-chlorocarbonic acid esters as derivatives of the carbonic acid in producing polycarbonates, catalysts may also be advantageous. Such catalysts are, for example, tertiary or quaternary organic bases or salts thereof such as trimethylamine, triethylamine, dimethylaniline, diethylaniline, dimethylcyclohexylamine and pyridine, for instance, the corresponding hydrochlorides and tetramethylammonium hydroxide, triethyloctadecyl ammonium chloride, trimethylbenzylammonium fluoride, triethylbenzylammonium chloride, dimethyldodecyl ammonium chloride, dimethylbenzylphenyl ammonium chloride, trimethylcyclohexyl ammonium broide and N-methylpyrodonium chloride in amounts of from about 0.002 to about 0.5% by weight. These compounds may be added to the reaction mixture before or during the reaction.

The reaction of dihydroxy compounds such as di-(monohydroxyaryl)-alkanes with phosgene or the chlorocarbonic acid esters of di-(monohydroxy)-alkanes in the presence of the polyhydric phenols and monohydric phenols may be carried out at room temperature or at lower or elevated temperatures, that is to say, at temperatures of from the freezing point up to about the boiling point of the mixture and preferably from about 0° C. to about 100° C. The reaction conditions should be such that about one mol of phosgene reacts with about one mol of the dihydroxy compounds.

By addition of from about 0.01–1 and preferably from about 0.05–0.5 mol percent of 1,4-bis-(4',4"-dihydroxy-triphenyl-methyl)-benzene and from about 0.1 to about 8, and preferably from 1–6 mol percent of monohydric phenols based on the mols of dihydroxy compound, it is possible to produce thermoplastic polycarbonates which contain a certain degree of branching but which are substantially free of crosslinking. In addition, these polycarbonates have a relative viscosity ranging from about 1.20 to about 1.55, an average molecular weight of between 30,000 and about 100,000 and a melt viscosity of between 20,000 and about 300,000 poises measured at 280° C.

In the formation of polycarbonates from either the solution polymerization reaction of the interfacial polycondensation reaction it is necessary to add both the 1,4-bis-(4',4"-dihydroxy-triphenyl - methyl) - benzene and the monohydric phenols to the hydroxy compounds which are reacted with phosgene or bis-chlorocarbonic acid esters in order to obtain the desired polycarbonate product having the desired properties of this invention. However, in the transesterification reaction, i.e. in the case of the reaction of the bis-phenols with carbonic acid aryl esters in the melt, it is only necessary to add the 1,4-bis-(4',4"-dihydroxy-triphenyl - methyl) - benzene in the above stated amounts and thus omit the addition of the monohydric phenols providing care is taken to prevent the monohydric phenol which is liberated by the reaction from the diaryl carbonate from being completely removed from the reaction mixture. As long as the monohydric phenol is present in the amount specified above, it will automatically participate in the synthesis of the polycarbonates.

Furthermore, in some of these cases, it is preferred to add surface active agents such as alkali metal salts of higher fatty acids or of sulphonic acids or of higher aliphatic or aromatic hydrocarbons and polyoxyethylated alcohols and phenols. Greater amounts of the quaternary ammonium bases mentioned above act as surface active agents.

Additives of all kinds can be added before, during or after the production of the polycarbonates. For example, additives such as dyestuffs, pigments, stabilizing agents against the effect of moisture, heat, ultraviolet radiation, lubricants, fillers such as glass powder, quartz products, graphite, molybdenum, disulphide, metal powders, powders of high melting synthetic resins, e.g. polytetrachloroethylene powder, natural fibres such as cotton and asbestos, as well as glass fibers of the most varied types, metal fibers as well as fibers which are stable during residence in the melt of the polycarbonate and do not markedly damage the polycarbonate may be added to the polycarbonate composition.

The polycarbonates produced according to the present invention are elastic thermoplastic materials which are soluble in a variety of organic solvents which can be worked up from solutions into shaped articles such as films, fibers or the like or into lacquer coatings. A polycarbonate which is prepared by this invention can be easily fabricated into useful articles, films, fibers, sheets, tubes, rods and the like from a melt or solution thereof by conventional shaping techniques such as melding, casting or extruding. Also, these polycarbonates can be used to make laminates such as safety glass, or to prepare protective or decorative coating.

In order that those skilled in the art may better understand how the present invention may be practiced, the following examples are given by way of illustration and not by way of limitation. The relative viscosities being measured on solutions of 0.5 g. of the product in 100 ml. methylene chloride at 25° C.

EXAMPLE 1

162 g. of 1,4-dibenzoyl benzene and 708.7 g. of phosphorus pentachloride are heated for 5 hours to about 135° C.; thereafter all volatile components are removed in the waterpump vacuum at a bath temperature of 160° C. 221 g. residue are obtained which correspond to a 98.3% crude yield of 1,4-bis-($\alpha,\alpha$-dichloro-benzyl)-benzene. The 1,4-bis-($\alpha,\alpha$-dichloro-benzyl)-benzene thus obtained is then added dropwise at 72° C. within 90 minutes to a solution of 525 g. of phenol and 300 ml. of dioxane; thereafter the reaction mixture is heated up to 124–137° C. and kept at this temperature for about 4 hours. After cooling the crystal paste is filtered off with suction, the residue is washed with a dioxane-ligroin (1:2) solution and dried. 1,4-bis-(4',4"-dihydroxy-triphenyl-methyl)-benzene yield: 292 g. (83% of the theory based on the crude 1,4-bis-($\alpha,\alpha$-dichloro-benzyl)-benzene)

If necessary, the recrystallization can be carried out from o-dichlorobenzene.

EXAMPLE 2

Preparation of a polycarbonate branched with the tetraphenol

Over a period of 2 hours at 24–26° C. 1825 g. of phosgene (15.8 mol) are introduced while stirring into a mixture of 3420 g. of bis-2-((4-hydroxyphenyl)-propane (15 mol), 14.1 g. of tetraphenol (0.024 mol=0.15% mol), 67.5 g. of p-tert.-butyl phenol (0.45 mol=3% mol), 4300 g. of 45% of sodium hydroxide solution (48 mol), 17,500 g. of distilled water and 33,000 g. of methylene chloride. Afterwards 6 g. of triethylamine are added to this mixture. After stirring for a further hour the organic phase is separated off, washed several times with 2% sodium hydroxide solution, 2% phosphoric acid and distilled water and finally worked up by the addition of chlorobenzene and the distilling off of the methylene chloride. The chlorobenzene solution gels upon cooling and is further worked up in a granulator to form a mixture of powder and grains. The resulting product is dried for 48 hours in the waterpump vacuum at a temperature of 120° C.

The relative viscosity of the product thus obtained is 1,340. The mean weight of the molecular weight which is measured by light diffusion amounts to 48,700.

EXAMPLE 3

In a suitable reactor there are reacted hourly 60 kg. of a solution of 131 kg. 2,2-bis-(4-hydroxyphenyl)-propane (574 mol)
640 kg. water
160 kg. of a 45% sodium hydroxide solution
50 g. sodium boron hydride
2010 g. tert.-butylphenol (-3.4 mol, 2.3 mol percent relative to bisphenol)
396 g. 1,4-bis-(4',4''-dihydroxy-triphenyl-methyl)-benzene (0.11 mol percent relative to bisphenol)

with 4.75 kg. phosgene in 90 kg. methylene chloride/chlorobenzene (1:1) and 3.05 kg. sodium hydroxide solution.

40 g. triethylamine and 0.7 kg. of a 45% sodium hydroxide solution are added hourly to the resulting mixture and worked up after an average residence time of 35 minutes in a stirrer cascade. The organic phase is separated off and washed with sodium hydroxide solution, 2% phosphoric acid and several times with pure water. After evaporation of the solution and extrusion of the melt, a granulate of relative viscosity 1.341 is obtained (measured in 0.5% by weight solution in $CH_2Cl_2$, at 20° C.). The molecular weight which is measured by light diffusion amounts to 43,100.

EXAMPLE 4

A branched polycarbonate which is produced according to Example 3 including 0.22 mol percent of 2,6-bis-(2' - hydroxy - 5' - methylphenylmethylene) - 4 - methylphenol instead of 396 g. 1,4-bis-(4',4''-dihydroxy-triphenylmethyl)-benzene shows a relative viscosity of 1,340 and the molecular weight which is measured by light diffusion amounts to 38,800.

EXAMPLE 5

An unbranched polycarbonate which is produced according to Example 3 without 0.11 mol percent 1,4-bis-(4',4''-dihydroxytriphenylmethyl)-benzene and including 2,100 g. (2.4 mol percent relative to bisphenol) of tert.-butylphenol instead of 2,010 g. tert.-butylphenol, has a relative viscosity of 1,337 and the molecular weight which is measured by light diffusion amounts to 32,800.

In the diagram the thermostability of the polycarbonates produced in Examples 3–5 is compared.

The abscissa (II) gives the number of extrusions, the ordinate (I) gives the Yellowness Index (Y–I), determined according to ASTM-D 1925–63 T.

The change of color is measured in relation to the number of extrusions in a S 30/20 D extruder at 300° C.

It can be seen from the diagram that the branched polycarbonate of the invention (line 3) has practically the same thermostability as unbranched polycarbonates (line 5); the color shade is only one shade darker after 5 extrusion stages, whereas the branched polycarbonate produced with 2,6-bis-(2-hydroxy-5'-methylphenylmethylene)-4-methylphenol (line 4) for the purpose of comparison is dyed deep brown-yellow.

EXAMPLE 6

In a suitable reactor there are reacted hourly in a continuous process 57 kg. of a solution of 130 kg. 2,2-bis-(4-hydroxyphenyl)-propane
631 kg. water
103 kg. of a 45% sodium hydroxide solution
50 g. sodium boron hydride
3000 g. tert.-butylphenol
358 g. 1,4-bis-(4,4'-dihydroxy-triphenyl-methyl)-benzene (0.1 mol percent relative to the sum of bisphenol)

with 4.75 kg. phosgene in 90 kg. methylene chloride/chlorobenzene 1:1 and 1.9 kg. sodium hydroxide solution while thoroughly stirring. A solution consisting of 60 g. triethylamine, 12 kg. 2,2-bis-(4-hydroxy-3,5-dibromophenyl)-propane, 1.8 kg. of a 45% sodium hydroxide solution and 50 kg. water are added hourly to the resulting precondensate and after an average residence time of 30 minutes in a stirrer cascade worked up in the manner described in Example 3.

Relative viscosity: 1.29
Molecular weight measured by light diffusion: 34,600

EXAMPLE 7

1145 g. phosgene are introduced at 20° C. over 100 minutes into a mixture of 660 g. 2,2-bis-(4-hydroxyphenyl)-propane
2475 g. 2,2-bis-(4-hydroxy-3,5-dichlorophenyl)-propane
12 g. 1,4-bis-(4',4''-dihydroxy-triphenyl-methyl)-benzene (0.2 mol percent relative to the sum of bisphenol)
88 g. p-tert.-butylphenol
4.8 g. triethylamine
26.4 kg. water
28.2 kg. methylene chloride
1720 g. of a 45% sodium hydroxide solution By dropwise introduction of a further 505 g. of a 45% sodium hydroxide solution the pH value is kept at 11–11.5 during the reaction with phosgene. Thereafter, 24 g. triethylamine and 355 g. sodium hydroxide solution are added and stirring continued for 1½ hours. Working up is carried out as described in Example 2.

Relative viscosity: 1.270
Molecular weight measured by light diffusion: 53,000

EXAMPLE 8

In a stainless steel 25 l. capacity autoclave equipped with a stirrer 7.000 g. of 2,2-(4',4''-dihydroxy-diphenyl)-propane, 6.700 g. of diphenylcarbonate, 0.01 g. of a disodium salt of bisphenol and 19.2 g. (0.1 mol percent relative to bisphenol) of 1,4-bis-(4',4''-dihydroxy-triphenylmethyl)-benzene are melted under nitrogen atmosphere. Subsequently about 5.100 g. of phenol are distilled off with agitation at a pressure of about 100 mm. Hg while slowly increasing the melt temperature from 180 to 240° C. During 1 hour the pressure is then gradually reduced to about 0.8 mm. Hg and the temperature increased to 300° C.

The polycondensation is continued to an end over a period of 2 hours.

The melt is spun off from the autoclave and granulated in the usual manner.

The polymer has a relative viscosity of 1,298.

What is claimed is:
1. 1,4-bis-(4',4''-dihydroxy-triphenylmethyl)-benzene.

References Cited

Benkeser, J. Am. Chem. Soc., 80, 3314–22 (1958).

JAMES A. PATTEN, Primary Examiner

M. SHIPPEN, Assistant Examiner

U.S. Cl. X.R.

260—47 XA, 651 R

UNITED STATES PATENT AND TRADEMARK OFFICE
CERTIFICATE OF CORRECTION

PATENT NO. : 3,799,953
DATED : March 26, 1974
INVENTOR(S) : Dieter Freitag, Ulrich Haberland and Heinrich Krimm It is certified that error appears in the above-identified patent and that said Letters Patent are hereby corrected as shown below:

Column 1, line 9, insert --Claims priority, application Germany, March 19, 1971, P 21 13 347.1--; same column, lines 14 and 15, delete one of the duplicate "bis-"; same column, line 16, correct the spelling of --triphenyl--; same column, line 16, after "and" insert --to--; same column, line 33, after "2,2-bis-[" delete "4,4'-(" and insert --4,4-(4,4'- --; same column, line 37, insert a hyphen between "1,4-bis" and "(4,4"-di".

Column 2, line 63, insert a hyphen after "1,4-bis" and before the opening parenthesis; same column, line 63, correct "4,4" " to --4',4"--; same column, line 63, correct --triphenyl-- so that it reads as one word.

Column 3, line 13, correct "dimethyldiphenyl" to --dimethyldiphenylene--; same column, line 60, correct the half parenthesis between "diphenyl" and "diphenylene" to a dash.

Column 6, line 66, correct the spelling of --bis-2-(4-hydroxyphenyl)-propane--.

Column 7, line 20, correct "(-3.4 mol," so that it reads --(13.4 mol,--.

Signed and Sealed this
fifteenth Day of June 1976

[SEAL]

Attest:

RUTH C. MASON
Attesting Officer

C. MARSHALL DANN
Commissioner of Patents and Trademarks